Dec. 2, 1947.  M. L. PUGH  2,432,069
BATTERY CHARGER
Filed Sept. 5, 1945
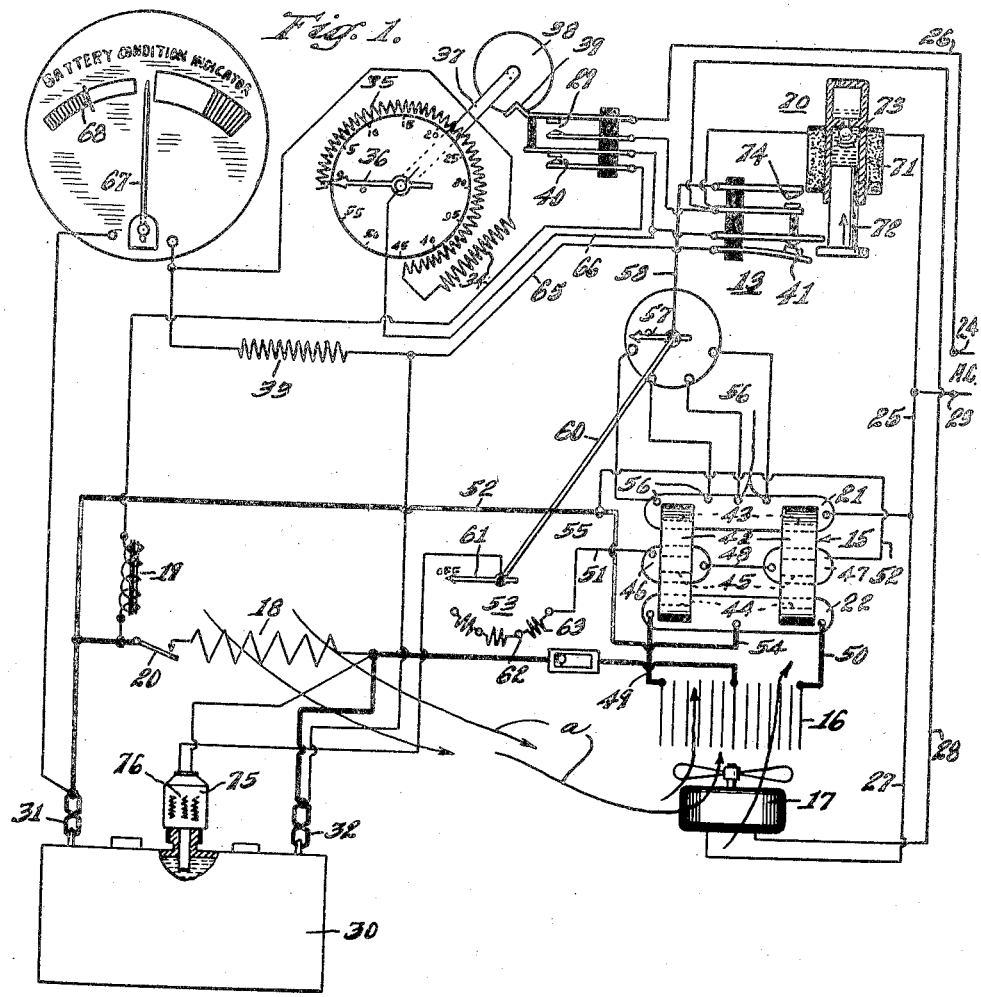
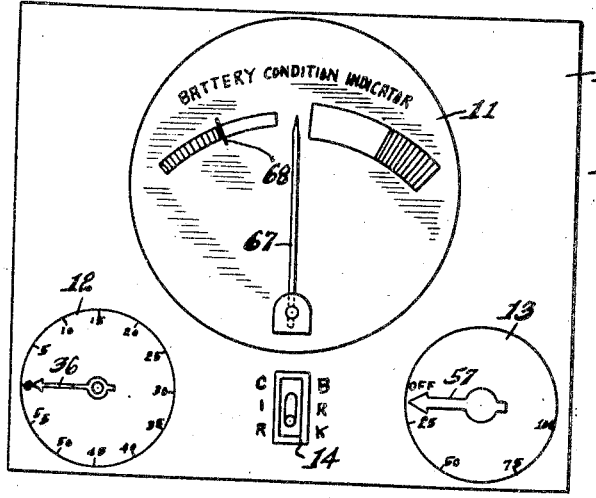
INVENTOR.
Merlin L. Pugh.
BY Bair & Freeman
Att'ys.

Patented Dec. 2, 1947

2,432,069

UNITED STATES PATENT OFFICE 2,432,069

BATTERY CHARGER

Merlin L. Pugh, Minneapolis, Minn.

Application September 5, 1945, Serial No. 614,467

16 Claims. (Cl. 320—20).

The present invention relates to battery charging apparatus and particularly to such apparatus for charging batteries at a high rate and in accordance with the condition of the battery.

In my co-pending application, Serial No. 603,454, filed July 6, 1945, for "Battery charging apparatus," there is provided an apparatus which may be electrically connected to a storage battery while it is in an automobile or the like, and the apparatus adjusted for determining the condition of the battery while simultaneously adjusting a time switch which will effect charging of the battery for a time period compatible with the tested reading for the battery when a charging control switch is subsequently adjusted and charges the battery at a predetermined high rate, which rate is automatically maintained by an automatic charging rate transformer. By utilizing this system, complicated battery charging technique is dispensed with, it being necessary for the user to make only two adjustments after connecting the storage battery to the charging apparatus, and thereafter complete charging is fully automatic.

In accordance with the foregoing application, the charge control switch is provided with an "off" position, and the operator first sets the time switch to the time required to charge the battery, which is automatically indicated for him when the needle reaches a predetermined point on the test scale, and then moves the charge control switch from the "off" position to whatever value of charging current is recommended or desired. This procedure obviously required two operations on the part of the user for each battery charged.

It is an object of the present invention to simplify still further the technique for charging storage batteries and to reduce the number of operations required of the user to a minimum.

It is another object of the invention to introduce a time delay into the operation of a storage battery charger so that the discharge circuit which is used for testing and setting the required time for charging the battery is opened after a predetermined relatively short time and the charging circuit is automatically closed to start charging at the rate set by the charging rate switch.

It is a further object of the invention to provide a battery charger wherein the charge control switch may be pre-set prior to the setting of the time control switch for the recommended or desired charging rate, and left at this setting, as long as desired, since many batteries to be charged are charged at the same or at the maximum charging rate, so that, in many instances, only one setting is made by the operator for charging a battery, i. e., the time switch setting, and thereafter all the remaining factors are automatically controlled.

It is still another object of the invention to coordinate, in a storage battery charger, a time control which automatically indicates the time required for charging, an automatic charging rate transformer controlled by a charging rate switch and, if desired, by thermostatic means responsive to battery temperature, and a time delay control for automatically switching from a discharge circuit, used for testing and time setting, to charging at the recommended or desired rate.

With these and other objects in view, my invention consists in the construction, arrangement and combination of the various parts of the device whereby the objects contemplated are attained, as hereinafter more fully set forth, pointed out in the claims, and illustrated in the accompanying drawings, in which:

Fig. 1 is an electro-diagrammatic view of the storage battery charger; and

Fig. 2 is a plan view of the control panel for the battery charger.

Referring to the drawing, numeral 10 indicates a panel on which is mounted a battery condition indicator, such as a voltmeter 11. A time switch 12 of a known type, having clock-actuated spring return mechanism, a charge control switch 13 and a circuit breaker 14, are also mounted on the panel 10. These devices may be mounted on top of a suitable housing (not shown) in which an automatic charging rate transformer 15, hereinafter described in detail, a rectifier 16, a fan 17, a load coil 18 and a relay comprising a relay coil 19 and a load switch 20 are mounted. These latter elements are shown in Fig. 1.

As also shown in Fig. 1, the transformer 15 has a primary coil 21 and a secondary coil 22. The primary coil 21 is adapted to be energized from a source of 110-volt A. C. current, for example, supplied through terminals 23 and 24 through power leads 25 and 26, respectively. The fan 17 is also energized from the terminals 23 and 24 through conductors 27 and 28, the fan being under control of a master switch 29. The transformer 15 is under control of the master switch 29 and a time delay switch hereinafter described. The fan 17 is so located as to dissipate heat from the rectifier 16 and the load coil 18, which load coil may carry a current of from 150 to 175 amperes from a storage battery 30 which is being tested and charged.

The battery 30 is, for example, the storage battery of an automobile, and it is connected to the secondary circuit by a pair of heavy spring clips 31 and 32. The circuit breaker 14 automatically trips out if the clips 31 and 32 are connected in wrong polarity relationship to the terminals of the battery 30, or if a heavy overload occurs while charging.

The voltmeter 11 is connected across the clips 31 and 32 with a resistor 33 in series with the voltmeter to depress the reading thereof. Shunting the resistor 33 are resistors 34 and 35 in series with each other. The resistor 35 is part of a rheostat, the movable blade of which is indicated at 36. The blade is mounted on a shaft 37, which shaft extends through and is connected with the timing mechanism of the time switch 12 for setting it. The shaft 37 has a cam 38 connected thereto, provided with a notch 39 for permitting a relay switch 40 and the master switch 29 to remain in the open position shown in Fig. 1, and to return to open position after the time switch 12 has been set and returns to the "0" or "off" position. The time switch 11 may be provided with minutes of time indicia, if desired, although this is unnecessary except as a means to indicate how long the time switch will run after being set. When the time switch is in the "off" position the rheostat 34—36 is at that time in its maximum resistance position.

A second relay switch 41 is in series with the relay switch 40 and these two switches are in series with the relay coil 19, the three being connected across the clips 31 and 32. When the relay coil 19 is energized, it closes the load switch 20.

The transformer 15 includes a core having end legs 42 connected by primary, secondary, and direct current legs 43, 44 and 45 respectively. This transformer is described and claimed in my Patent No. 2,235,330, issued March 18, 1941, for "Battery charger."

The legs 43 and 44 may be arranged double or in a plurality of other arrangements, but as to the legs 45, two of necessity are provided. On the legs 45, direct current coils 46 and 47 are provided and the coils are connected in series by conductor 48. On the primary legs 43 of the transformer the primary coil 21 is wound. On the secondary legs 44, the secondary coil 22 is wound. Alternating current is supplied to the primary coil 21 from the terminals 23—24, as explained hereinbefore. Output from the secondary coil 21 is conveyed to the rectifier 16 through conductors 49 and 50, whereby rectified current is supplied to the battery for charging it. With the exception of the direct current coils 46 and 47, a standard transformer so far has been described, without regulation. The direct current coils 46 and 47 provide automatic regulation. For this purpose a pair of conductors 51 and 52 connect the coils 46 and 47 across the battery, the conductor 51 connecting the coil 46 to the battery through a variable resistance 53, for a purpose hereinafter described. A conductor 54 connects a center tap on the secondary coil 22 to the battery clip 31, the conductor 52 is connected to conductor 54 at 55.

The charge control switch 13 is provided with several positions marked for convenience "off," 25, 50, 75 and 100 amperes. A terminal is provided at each of these points which terminals are connected to suitable taps 56 on the primary coil 21 of the transformer. A movable contact arm 57 has one side thereof connected to one side of the main switch 29 by conductor 58 and makes contact with the desired terminal as it is rotated. An insulated shaft 60 connects the contact arm 57 with a second contact arm 61 associated with the resistance 53 and the two arms, therefore, move together. One side of the arm 61 is connected to the battery terminal 32 through conductor 51 and the other side of the arm contacts terminals 62, corresponding to the terminals on the charge control switch 13, with resistances 63 in series between the terminals 62. The resistances 63 are connected to the direct current coil 46 through the other end of conductor 51.

When the arm 57 of the charge control switch is in the "off" position, it positions arm 61 of the variable resistance 53 in the "off" position, thus breaking the circuit from the D. C. coils 46 and 47 to the battery 30.

In accordance with the present invention, a time delay device indicated generally at 70 is provided and is of conventional construction embodying a coil 71 and an iron core 72 which is moved upwardly when the coil 71 is energized. A hydraulic device 73 retards movement of the core 72 in a well-known manner. In addition to the relay switch 41, a time delay switch 74 is provided and is connected in series with the main switch 29 and the primary coil 21 of the transformer so that both switches 29 and 74 must be closed before the transformer 15 is energized.

As shown in Fig. 1, switches 29, 40 and 74 are open and switch 41 is closed when the apparatus is not in use. As soon as the time control switch is turned from the "off" position, switches 29 and 40 are closed and relay coil 19 and coil 71 of the time delay device are energized, thus throwing load coil 18 across the battery as hereinafter described. After a short time, the core 72 of the time delay device is drawn upwardly and switch 41 is opened, thereby de-energizing load relay coil 19 and switch 74 is closed, thus energizing the primary coil 21 of the transformer. The switches remain in this position until the cam 38 rotates back to the "off" position and notch 39 effects opening of switches 29 and 40, thereby de-energizing the time delay coil 71 and preventing energization of the relay coil 19, since the switches return to the position shown in Fig. 1. The transformer 15 is also de-energized and charging ceases.

It is desirable to provide a temperature responsive device shown generally at 75 and connected in series with resistors 63, in the manner set forth in my co-pending application, Serial No. 614,466, filed September 5, 1945, for "Battery charging apparatus." As explained therein, as the temperature of the battery reaches predetermined values, more resistance indicated diagrammatically at 76 is added to the D. C. coil circuit of the transformer 15 and the output thereof is automatically reduced until the temperature again assumes a safe value for charging.

*Operation*

In the operation of the battery charging apparatus, when the parts are in the position shown in Fig. 1, that is, with the time switch 12 set at "0" or "off" and the charge control switch at the "off" position, the clips 31 and 32 may be connected to the terminals of a storage battery 30 and the voltmeter will give a reading which has no particular significance. In order to test the battery, it is necessary to test its voltage with a load applied thereto.

The operator then rotates the time switch 12 from the "0" position which causes the cam 38 to close the switches 29 and 40 and reduce the resistance in the resistor 35. Closure of the master switch 29 causes the fan 17 to operate (for subsequently dissipating heat from the rectifier 16 and load coil 18) and supplies current to the charging switch blade 57 through conductor 58, after time delay switch 74 is closed. Closure of the switch 40 energizes the relay coil 19 through the relay switch 41 and conductors 65 and 66 thereby closing switch 20 to throw the load coil 18 across the terminals of the battery 30. This will cause an indicating needle 67 to drop to a lower reading, because the battery is discharging, and accordingly a true test of the battery can now be made on the voltmeter. If the battery is partially discharged, the needle will fall below a check line indicated at 68. If the needle is above the check line 68, it indicates that the battery does not require charging.

The timer switch 12 is now adjusted further clockwise which causes the resistance 35 to be gradually reduced and this increases the flow of current through the voltmeter 11 so that the needle 67 swings further toward the right. When it reaches the check line 68, this indicates to the operator that the time switch 12 has been properly adjusted.

If it is impossible for the operator to bring the needle up to the check line 68, even after rotating the knob 36 to the extreme clockwise position, it indicates that the battery is in a questionable state and should be given a five-minute trial charge at 80 amperes and re-tested again in the above manner. If, after a trial charge, the operator is still unable to bring the needle 67 up to the check line 68, the battery may be considered defective and should be discarded.

The charge control switch 13 is either adjusted prior to this time or may be adjusted before the time delay switch 70 closes contacts 74 by rotating the arm 57 to one of the marked positions. After a short time the time delay device 70 opens the relay switch 41 to effect de-energization of the relay coil 19 thereby opening switch 20 to break the circuit to the load coil 18. It is, of course, desirable to remove the load of the coil from the battery as soon as possible. At the same time the time delay switch 74 is closed, thus closing the charging circuit and energizing transformer 15.

The movement of the arm 57 of the charge control switch 13 also moves arm 61 of the variable resistor 53 to one of its positions in which more or less resistance is in the circuit to the D. C. coils 46, 47 of the transformer 15. The primary 21 of the transformer 15 is also in the circuit at a value determined by the arm 57 and terminals of the charge control switch 13. Charging of the battery will continue for the proper time, depending on the setting of the time switch 12, as already described.

Furthermore, the charging rate will be maintained constant, unless an abnormally high temperature is produced in the battery 30, because the taps 56 on the primary coil 21 will give an approximately constant charge and the D. C. coils 46 and 47 on the transformer will maintain the set rate constant in the following manner, it being understood that the resistances 63 will permit more or less current to flow to the coils 46 and 47 depending on the setting of arm 61 as determined by the setting of arm 57 and the taps in use on the primary coil 21 of the transformer. Once the value is set for charging however, it will not vary as the battery becomes more fully charged and the resistance to current flow therethrough increases (the charging voltage remaining constant).

The connection of the direct current coils 46 and 47 in series and in opposition causes the resultant of the alternating current voltage built up in each coil to buck each other and the current at leads 51 and 52 is, therefore, zero. Connecting these leads across the battery 30 results in the current from the battery energizing the coils 46 and 47 in proportion to the strength of the battery. The direct current in the coils 46 and 47 causes a direct current magnetic flux in the legs 45 of the transformer. This reduces the number of alternating current flux lines in the legs 45 and forces them into the legs 44, thereby increasing or decreasing the secondary current from the secondary coil depending on the amount of current flowing in the coils 46 and 47. As a result, regardless of the condition of the battery 30 at various stages of the charging process, the rate of charging will remain constant. It is obvious that at low charging rates more of the resistances 63 are in the circuit leading to the D. C. coils 46 and 47 and, therefore, the current in the coils will be less and the charging rate lower, but constant and in accordance with the taps 56 in use on the primary coil 21 of the transformer. As higher charging rates are desired, the resistances 63 are successively removed from the circuit and higher and constant charging rates result because of increased D. C. current in the coils 46 and 47, and because of the increased effective portions of the primary coil 21.

After the load circuit is opened by opening of relay switch 41 by the time delay device 70, the voltmeter 11 will give a different reading because the resistances 34 and 35 are out of the circuit due to the opening of switch 41 and due to the battery now being charged rather than discharged. The needle 47 during charging should fall above the check line 68 and will gradually indicate a higher voltage by swinging toward the dark portion of the scale toward the right, the left end of this portion indicating about 8 volts. If the voltage then rapidly rises in this portion of the charging zone, it indicates full charge.

From the foregoing description, it will be obvious that I have provided a battery charging apparatus wherein the matter of setting the charger for proper time of charging is reduced to a single operation and wherein the rate of charge when set remains constant without adjustment or the necessity for the operator to watch an ammeter. Furthermore, a time delay device automatically opens the testing circuit and closes the charging circuit. Thus, for a battery that may be charged at a high rate, there are only three operations necessary, namely: (1) placing the clips 31 and 32 on the battery, (2) rotating the arm 36 of the time control switch 12 until needle 67 of voltmeter 11 reaches the line 68; and (3) adjusting the charge control switch 13.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In battery charging apparatus, a discharge circuit including a voltmeter connected with said battery to indicate the voltage thereof, a battery charging circuit including a time switch, a variable rheostat in circuit with said meter and connected with said time switch to set the proper time period for charging the battery in accordance with a predetermined reading on the voltmeter, a charging switch adjustable to effect various charging rates, a transformer effective to automatically maintain the charging rate at the desired value, and a time delay switch for closing the discharge circuit for a sufficient time for the operator to set the time switch in accordance with said predetermined voltmeter reading, said time delay switch then opening the discharge circuit and closing the charging circuit under control of said transformer to charge the battery at the rate determined by the setting of said charging switch.

2. In a battery charging apparatus, a discharge circuit including a voltmeter connected with said battery to indicate the voltage thereof, a battery charging circuit including a time switch for setting the time for which said battery is to be charged, a variable rheostat in circuit with said meter and connected with said time switch to set the proper time period for charging the battery in accordance with a predetermined reading on the voltmeter, a charging switch adjustable to effect various charging rates, and a time delay switch for closing the discharge circuit for a sufficient time for the operator to set the time switch in accordance with said predetermined voltmeter reading, said time delay switch then opening the discharge circuit and closing the charging circuit to charge the battery at the rate determined by the setting of said charging switch.

3. In battery charging apparatus, a discharge circuit including a voltmeter connected with said battery to indicate the voltage thereof, a battery charging circuit including a time switch for setting the time the battery is to be charged in accordance with an automatically registered value on said voltmeter, a charging switch adjustable to a plurality of charging rates of the charging circuit, and a time delay switch for first completing only said discharge circuit and for thereafter opening the discharge circuit and closing the charging circuit.

4. In battery charging apparatus, a discharge circuit including a voltmeter connected with said battery to indicate the voltage thereof, a battery charging circuit including a manually adjustable time switch for setting the time the battery is to be charged, a master switch closed by movement of the time control switch from its "off" position, a charge control switch in the charging circuit for manually setting the rate of charge to said battery and a time delay switch energized by closing said master switch for closing said charging circuit a predetermined time after said time control switch is moved from its "off" position.

5. In battery charging apparatus, a discharge circuit including a voltmeter connected with said battery to indicate the voltage thereof, a load for testing said battery and a relay coil for placing the load on the battery in parallel with the voltmeter, a battery charging circuit including a manually adjustable time switch for setting the time the battery is to be charged and including an "off" position, a master switch, a relay switch and a time delay switch, said relay switch being closed when said time switch is moved from the "off" position to close said discharge circuit and energize the relay coil to place the load across said battery, said master switch being also closed to close a circuit to energize the time delay switch, and said time delay switch after a predetermined time opening said discharge circuit and closing said charging circuit.

6. In battery charging apparatus, a discharge circuit including a voltmeter connected with said battery to indicate the voltage thereof, a battery charging circuit including a manually adjustable time switch for setting the time the battery is to be charged, a master switch closed by movement of the time control switch form its "off" position, a charge control switch in the charging circuit for manually setting the rate of charge to said battery and a time delay switch energized by closing said master switch for closing said charging circuit a predetermined time after said time control switch is moved from its "off" position, said voltmeter being still connected across said battery.

7. In battery charging apparatus, a discharge circuit including a voltmeter connected with said battery to indicate the voltage thereof, a load for testing said battery and a relay coil for placing the load on the battery, a battery charging circuit including a manually adjustable time switch for setting the time the battery is to be charged and including an "off" position, a master switch, a relay switch and a time delay switch, said relay switch being closed when said time switch is moved from the "off" position to close said discharge circuit and energize the relay coil to place the load across said battery, and a rheostat connected to said time control switch and said voltmeter for automatically indicating on said voltmeter the proper setting of the time switch, said master switch being also closed when said time switch is moved from the "off" position to close a circuit to energize the time delay switch, and said time delay switch after a predetermined time opening said discharge circuit and closing said charging circuit.

8. In battery charging apparatus, a discharge circuit including a voltmeter connected with said battery to indicate the voltage thereof, a battery charging circuit including a manually adjustable time switch for setting the time the battery is to be charged, a master switch closed by movement of the time control switch from its "off" position, a charge control switch in the charging circuit for manually setting the rate of charge to said battery, a time delay switch energized by closing said master switch for closing said charging circuit a predetermined time after said time control switch is moved from its "off" position, and a manually adjustable charging switch in said charging circuit for setting the charging rate of said charging circuit.

9. In battery charging apparatus, a discharge circuit including a voltmeter connected with said battery to indicate the voltage thereof, a battery charging circuit including a manually adjustable time switch for setting the time the battery is to be charged, a master switch closed by movement of the time control switch from its "off" position, a charge control switch in the charging circuit for manually setting the rate of charge to said battery, a time delay switch energized by closing said master switch for closing said charging circuit a predetermined time after said time control switch is moved from its "off" position, a manually adjustable charging switch in said charging circuit for setting the charging rate of said charging circuit and a transformer in said charging circuit including means for maintaining the chosen charging rate constant.

10. In battery charging apparatus, a discharge circuit including a voltmeter connected with said battery to indicate the voltage thereof, a battery charging circuit including a manually adjustable time switch for setting the time the battery is to be charged, a master switch closed by movement of the time control switch from its "off" position, a charge control switch in the charging circuit for manually setting the rate of charge to said battery, a time delay switch energized by closing said master switch for closing said charging circuit a predetermined time after said time control switch is moved from its "off" position, and means responsive to the temperature of the battery for varying the rate of charging current supplied thereto.

11. In battery charging apparatus, a discharge circuit including a voltmeter connected with said battery to indicate the voltage thereof, a battery charging circuit including a manually adjustable time switch for setting the time the battery is to be charged, a master switch closed by movement of the time control switch from its "off" position, a charge control switch in the charging circuit for manually setting the rate of charge to said battery, a time delay switch energized by closing said master switch for closing said charging circuit a predetermined time after said time control switch is moved from its "off" position, a manually adjustable charging switch in said charging circuit for setting the charging rate of said charging circuit, and means responsive to the temperature of said battery for lowering the charging rate if the temperature reaches a predetermined high value.

12. In battery charging apparatus, a discharge circuit including a voltmeter connected with said battery to indicate the voltage thereof, a battery charging circuit, a charging switch adjustable to a plurality of charging rates of the charging circuit, and a time delay switch for first completing only said discharge circuit and for thereafter opening the discharge circuit and closing the charging circuit.

13. In battery charging apparatus, a discharge circuit including a voltmeter connected with said battery to indicate the voltage thereof, a battery charging circuit, and a time delay switch for first completing only said discharge circuit and for thereafter opening the discharge circuit and closing the charging circuit.

14. In battery charging apparatus, a discharge circuit including a voltmeter connected with said battery to indicate the voltage thereof, a battery charging circuit including a manually adjustable time switch for setting the time the battery is to be charged, a master switch closed by movement of the time control switch from its "off" position, and a time delay switch energized by closing said master switch for closing said discharge circuit for a predetermined time period and thereafter opening said discharge circuit and closing said charging circuit.

15. Battery testing apparatus for high rate battery charging comprising a meter circuit adapted to be connected to terminals provided on said battery, a battery load circuit adapted to be connected to said battery terminals, a fixed load in said battery load circuit, a switch for closing said load circuit during testing, a voltage responsive meter connected in said meter circuit, a battery charging circuit including a time switch for setting the time the battery is to be charged in accordance with an automatically registered value on said voltmeter, said meter including indicia to visually determine in time units, without the necessity of calculations, the period of time required to substantially fully charge the battery at a high rate and a time delay means for automatically disconnecting said battery load and establishing said charging circuit a predetermined time after said load has been connected in said battery load circuit.

16. Battery testing and charging apparatus for high rate battery charging comprising a meter circuit adapted to be connected to terminals provided on the battery, a battery load circuit adapted to be connected to said battery terminals, a fixed load for said battery circuit, means for connecting said load into said battery load circuit during testing, a charging circuit, a time switch in the charging circuit containing time indicia thereon, a voltmeter connected in said meter circuit, said voltmeter including indicia for visually determining in time units, in conjunction with said time indicia on said time switch, the amount of time required to substantially fully charge the battery, without the necessity of any calculations, and a time delay means for automatically disconnecting said battery load and establishing said charging circuit a predetermined time after said load has been connected in said battery load circuit.

MERLIN L. PUGH.

REFERENCES CITED

The following references are of record in the file of this patent:

UNITED STATES PATENTS

| Number | Name | Date |
| --- | --- | --- |
| 1,846,214 | Leingang | Feb. 23, 1932 |
| 2,235,330 | Pugh | Mar. 18, 1941 |
| 2,272,745 | Hinds et al. | Feb. 10, 1942 |
| 2,285,620 | Sears | June 9, 1942 |
| 2,346,992 | Priest | Apr. 18, 1944 |
| 2,347,452 | Amsden | Apr. 25, 1944 |
| 2,355,488 | Van Vulpen et al. | Aug. 8, 1944 |
| 2,366,505 | Fletcher | Jan. 2, 1945 |
| 2,377,596 | Williams | June 5, 1945 |